US006829229B1

(12) United States Patent
Palermo et al.

(10) Patent No.: US 6,829,229 B1
(45) Date of Patent: Dec. 7, 2004

(54) RADIO TRANSMISSION TIMING CALIBRATOR

(75) Inventors: Keith Charles Palermo, Higley, AZ (US); Mike Francis Durkin, Cave Creez, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/570,129

(22) Filed: May 12, 2000

(51) Int. Cl.[7] .............................................. H04J 75/00
(52) U.S. Cl. ...................................................... 370/347
(58) Field of Search ................................ 370/342–347, 370/332, 321–327, 341, 359, 369; 455/116, 502–509, 517, 12.1, 72, 324, 13.2, 126; 340/573.4, 825.49; 375/346, 326, 373, 222, 344, 261, 294, 362–365

(56) References Cited

U.S. PATENT DOCUMENTS

| | | | | |
|---|---|---|---|---|
| 5,854,971 A | * | 12/1998 | Nagoya et al. | 455/126 |
| 5,943,381 A | * | 8/1999 | Zampetti | 375/376 |
| 6,072,842 A | * | 6/2000 | Janesch et al. | 375/326 |
| 6,173,160 B1 | * | 1/2001 | Liimatainen | 455/67.11 |
| 6,181,755 B1 | * | 1/2001 | Junell | 375/362 |
| 6,470,057 B1 | * | 10/2002 | Hui et al. | 375/294 |
| 6,590,881 B1 | * | 7/2003 | Wallace et al. | 370/332 |

* cited by examiner

Primary Examiner—Chi Pham
Assistant Examiner—Prenell Jones
(74) Attorney, Agent, or Firm—Jenner & Block LLP

(57) ABSTRACT

A signal calibrator (14) for a software-defined communications device (10) that enables device communications signals to be transmitted in a manner that maximally decouples the calibrator (14) from the device hardware (40), and that simplifies the design and reduces the cost of the communications device (10). The calibrator (14) includes a software modulator (16) for generating a nonstop stream of samples including zero valued samples and non-zero valued waveform bursts, and a software demodulator (18) connected to the software modulator (16) via a closed loop feedback path (20) that receives a nonstop stream of samples. The non-zero valued samples create radio emissions. The software demodulator (18) is for determining a timing error of the transmission sample and for transmitting a timing error correction value to the software modulator (16) via the closed loop feedback path (20). The timing error correction value enables the software modulator (16) to adjust a transmission time of a subsequent waveform burst to compensate for both unknown hardware delays and RF signal propagation delays.

19 Claims, 2 Drawing Sheets

RADIO TRANSMISSION TIMING CALIBRATOR

BACKGROUND OF THE INVENTION

1. Field of the Invention

The present invention relates generally to software-defined communications devices, and particularly to the calibration of device communications signals in a manner that maximally decouples device software from device hardware, simplifies device design, reduces device cost and enhances device software portability.

2. Description of Related Art

Conventional open architecture software-defined communications systems operating on a network, such as a TDMA or frequency hopped network, enable system hardware and software components to be added, removed or upgraded on an as-needed basis. Such systems therefore provide both system users and designers with a high degree of flexibility in adapting to changing communication needs and demands.

Radios utilized in open architecture software-defined communications systems must transmit signals at precise times in order to be compatible with network signal transmission protocol. Because these signals often have associated system hardware delays and/or external propagation delays, conventional radios must typically include timing circuits or microprocessor timers to compensate for the delays when the signals are demodulated.

However, such conventional signal delay compensation techniques have limitations. For example, the above-mentioned timing circuits require that specialized hardware be added to each radio to generate delay-compensation interrupt timing signals. The required timing circuit components must be designed to compensate for a specific type of waveform, thereby limiting the use of the radio only to reception of signals that are compatible with the timing circuits. The additional required hardware components for the circuits also increase the overall cost of each radio.

Further, the accuracy of microprocessor timers is directly related to the corresponding microprocessor clocks. Commercial microprocessor card vendors commonly utilize low cost crystal oscillators to drive microprocessor clocks. Because crystal oscillators are subject to frequency drift over time and due to fluctuations in temperature, the accuracy of such timers in compensating for modulation delays is often limited. In addition, numerous types of microprocessor timers with varying degrees of precision are commercially available. Therefore, as the resulting demodulator accuracy depends on the specific type of microprocessor, systems incorporating such timers for signal delay compensation must be designed for use with a specific microprocessor timer.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
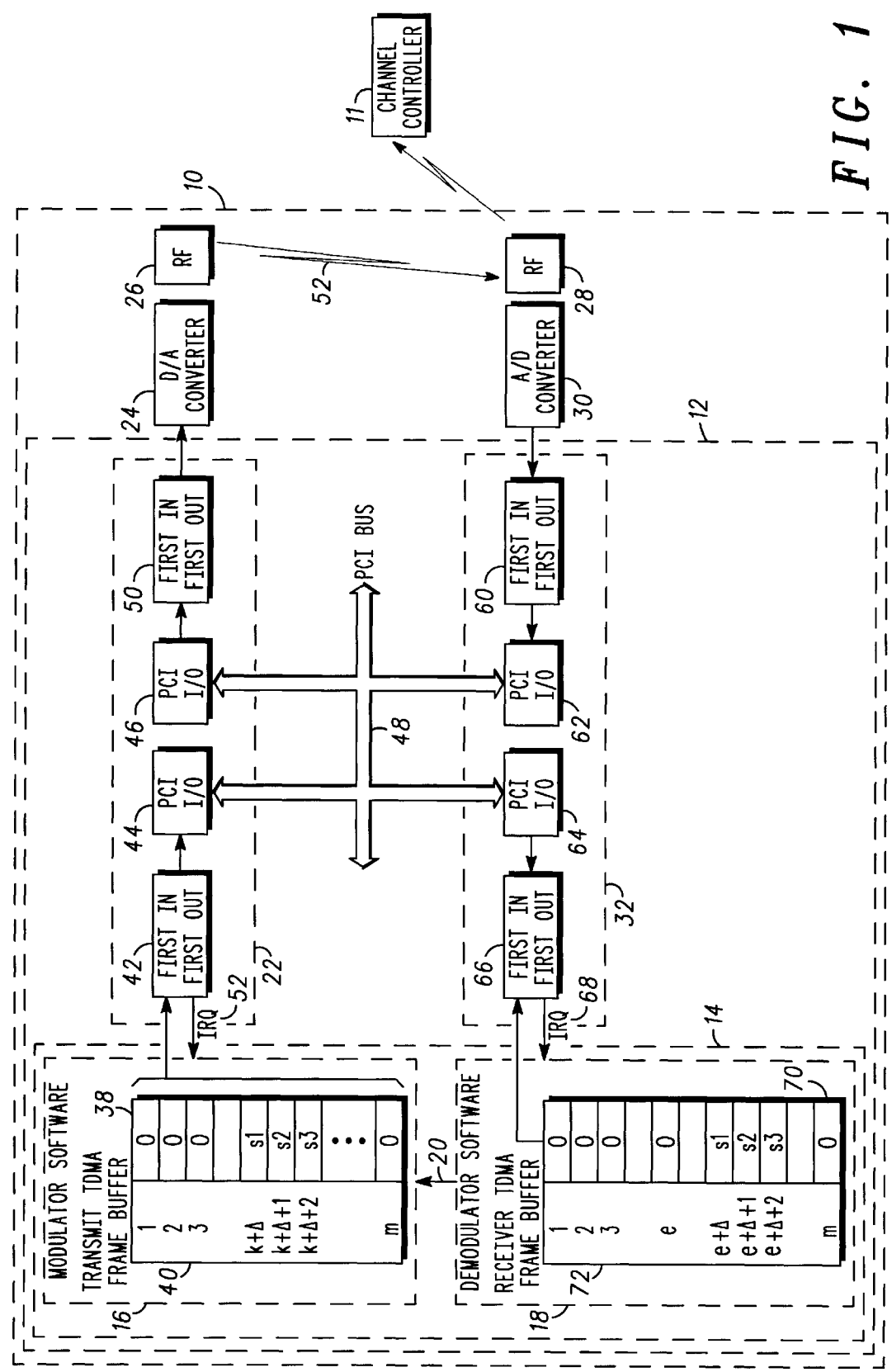
FIG. 1 is a block diagram of a typical system employing the software components of a signal calibrator according to a preferred embodiment of the present invention.

Referring now to the drawings in which like numerals reference like parts, FIG. 1 shows several components of a software-defined communications device, such as a Wireless Information Transfer System (WITS) radio 10, of the type manufactured and sold by Motorola, the assignee of the present invention. The radio 10 transmits signals over a radio network such as a TDMA or frequency hopped network, and includes a signal calibrator according to a preferred embodiment of the present invention. As is commonly used in such networks, a system-wide timing mark is transmitted to all radios from a single radio commonly referred to as a channel controller 11. As will be discussed in detail, the signal calibrator of the present invention is a software-implemented calibrator and therefore enables the radio 10 to compensate for group delays in radio-modulated signals in a manner that decouples the radio software from the radio hardware, and in a manner that does not require hardware timing circuits or microprocessor-implemented timers.

The radio 10 includes a modem processor 12 that is a sub-component of a main radio processor (not shown) and that controls the transmission of RF signals from the radio 10. A signal calibrator 14 according to a preferred embodiment of the present invention is programmed into the modem processor and includes a software modulator 16 and a software demodulator 18. The signal calibrator 14 adjusts the timing of RF signals transmitted by the radio 10 to compensate for signal transmission delays in a manner that will be discussed below in more detail.

The modulator 16 is connected at its input to the demodulator 18 via a closed loop feedback path 20 and at its output to an input of a modulator pipeline 22. The modulator pipeline 22 is a hardware-implemented sub-component of the modem processor 12 and is connected at its output to a D/A converter 24. The D/A converter 24 is a hardware sub-component of the modem processor 12 and is connected at its output to an RF transmitter 26. The RF transmitter 26 is a hardware component of the radio 10 and is in communication with an RF receiver 28, which is also a hardware component of the radio 10.

The RF receiver 28 is connected at its output to an input of an A/D converter 30. The A/D converter 30, as with the D/A converter 24, is a hardware sub-component of the modem processor 12, is connected at its output to an input of a demodulator pipeline 32. The demodulator pipeline 32 is a hardware sub-component of the modem processor 12 and is connected at its output to an input of the software demodulator 18.

Still referring to FIG. 1, the software modulator 16 generates a digital TDMA signal, and includes a transmit TDMA frame buffer 38 including a buffer counter 40. The transmit TDMA frame buffer 38 queues individual signal samples before transmitting the samples to the modulator pipeline 22. More specifically, the software modulator 16 continuously generates a signal that includes both zero valued samples and non-zero valued radio signal samples, hereinafter referred to as a waveform burst, including data samples to be communicated to a receiving communications device (not shown) and to the software demodulator 18 in accordance with the clocking period of a modem processor clock (not shown). The sample stream includes samples of zero valued data such as samples 1, 2, 3, in the transmit TDMA frame buffer 38. The samples 1, 2, 3, ... m, are continuously emitted during clocking of the D/A converter 24 and the A/D converter 30 regardless of whether a waveform burst, such as the one represented by samples s1, s2, s3m in the transmit TDMA frame buffer 38 is generated. The buffer counter 40 counts the number of samples queued in the TDMA sample buffer 38 to track the relative temporal location of waveform burst data samples for each transmission sample for signal calibration purposes as will be described below in more detail.

The modulator pipeline 22 receives and queues the TDMA signal samples output from the software modulator 16 before outputting the samples to the D/A converter 24. Specifically, a first pipeline queue, such as a FIFO 42, temporarily stores the received signal data samples before passing the samples to the D/A converter 24. The first modulator pipeline FIFO 42 passes the signal samples by outputting the samples to a PCI bus interface transmitter 44, which in turn outputs the samples to a PCI bus interface receiver 46 over radio data bus 48. The data bus 48 is a hardware component of the radio 10 and is utilized by other radio components as well; therefore, the signal samples are delayed by an amount of time that is dependent upon the amount of other data being transferred over the data bus 48 at the time the signal samples are to be passed from the PCI bus interface transmitter 44 to the PCI bus interface receiver 46. The first modulator pipeline FIFO 42, in combination with a second queue such as a second modulator pipeline FIFO 50, absorbs the random timing variations in the delivery of signal samples from the software modulator 16 to the D/A converter 24 due to, for example, delays caused by the bus 48, so that the number of samples input into the D/A converter 24 from the data bus 48 during a predetermined time period never falls below or rises above a predetermined input rate.

The modem processor 12 can cause the software modulator 16 to send additional signal samples to the first modulator FIFO 42 by sending interrupt request signals to the software modulator 16 via, for example, a pipeline IRQ line 52, or via another conventional method such as polling. The signal samples received at the PCI bus interface receiver 46 are output to and queued in the second modulator pipeline FIFO 50 before being output to, and converted to an analog signal 52 by, the D/A converter 24. The converted analog signal 52 then is output to the RF transmitter 26.

The RF transmitter 26, in addition to transmitting the analog signal 52 to a receiving communications device or devices (not shown), transmits the analog signal 52 to the RF receiver 28, which in turn inputs the signal 52 into the A/D converter 30. The A/D converter 30 converts the received analog signal 52 back into a digital signal that includes the sample stream data samples 1, 2, 3 . . . , m and the waveform burst data samples s1, s2, s3 . . . , and outputs the signal samples to the demodulator pipeline 32. More specifically, the digital signal samples are output to a first demodulator pipeline queue, such as a first demodulator pipeline FIFO 60. The first demodulator FIFO 60 queues and outputs the signal samples to a demodulator pipeline PCI bus interface transmitter 62, which in turn passes the signal samples to a demodulator pipeline PCI bus interface receiver 64 over the data bus 48 based on the availability of the data bus 48. Upon receiving the signal samples, the demodulator pipeline PCI bus interface receiver 64 sends the signal samples to a second demodulator pipeline queue, such as a second demodulator pipeline FIFO 66.

As with the modulator pipeline FIFOs 42, 50, the demodulator pipeline FIFOs 60, 66 absorb random timing variations in the delivery of the signal samples to the software demodulator 18 so that the number of samples output from the A/D converter 30 during a predetermined time period never falls below or rises above a predetermined output rate. Also, the modem processor 12 can cause the demodulator 18 to accept additional signal samples from the second demodulator pipeline FIFO 66 by sending interrupt request signals to the software demodulator 18 via, for example, a pipeline IRQ line 68, or via another conventional method such as polling.

As with the software modulator 16, the software demodulator 18 includes a receive TDMA frame buffer 70 with a buffer counter 72. The receive TDMA frame buffer 70 queues the signal samples received from the second demodulator pipeline 32, while the buffer counter 72 counts the number of samples queued in the TDMA sample buffer 70 to track the temporal location of sample stream and waveform burst data samples for signal calibration purposes. As shown in FIG. 1, the software demodulator 18 receives all data samples generated by the software modulator 16 regardless of whether the software modulator 16 is actually generating a radio signal. Referring to the exemplary signal shown in FIG. 1 that includes both the zero valued sample stream data samples 1, 2, 3, and the waveform burst data samples s1, s2, s3 . . . , the receive TDMA frame buffer 70 stores these signal samples in the same sequential order as used in the transmit TDMA frame buffer 38 for each transmission sample. However the perception of the software demodulator 18 as to when the signal samples were captured by the A/D converter 30 is blurred due to the variance in transport delays caused by the bus 48. Additionally, the perception of the demodulator 18 as to when the samples were transmitted by the D/A 24 is blurred due to variations in the external signal propagation delays. The software modulator 16 and demodulator 18 adjust the timing of the transmitted signal based on transmit and receive timing data generated by the buffer counters 40, 72 in a manner that compensates for the timing delays.

More specifically, the buffer counter 40 of the software modulator 16 maintains a count of the signal samples queued in and transmitted from the transmit TDMA frame buffer 38, and the buffer counter 72 of the software demodulator 18 maintains a count of the signal samples received and queued in the receive TDMA frame buffer 70 for each transmission sample. Therefore, the software demodulator 18 can precisely measure relative temporal discrepancies in transmitted signal samples by comparing actual signal sample arrival times with expected signal sample arrival times relative to the timing mask signal sample transmitted by the previously-mentioned channel controller 11. With reference to the exemplary signal samples shown in FIG. 1, once the signal samples are received by the software demodulator 18 and queued in the receive TDMA frame buffer 70, the software demodulator 18 computes the expected buffer location for communications signal sample s1 transmitted from the software modulator 16 to transmit TDMA frame buffer location based on sampled counts maintained by the buffer counters 40, 72.

As shown in FIG. 1, the demodulator 18 determines that a zero valued data sample from the sample stream is actually located at buffer location e, which is the expected location of the first waveform burst data sample s1, while the first waveform burst data sample s1 is actually stored in a later buffer location e+Δ. The software demodulator 18 therefore determines that the signal time delay is the time period between the sample stream zero valued data sample at buffer location e and the waveform burst data sample at buffer location e+Δ, and outputs an error correction value representative of the delay to the software modulator 16 via the feedback path 20. The software modulator 16 then utilizes this error correction value to adjust the output time of subsequent waveform bursts by either inserting or deleting zero valued data samples into the continuous data stream. In other words, the software modulator 16 can either temporally retard or advance the waveform within a subsequent transmission sample by either increasing or decreasing the number of zero valued data samples transmitted in front of the waveform burst data samples. Therefore, with reference to the exemplary signal in FIG. 1, the number of sample stream zero valued data samples in front of the first waveform burst data sample s1 can be increased or decreased in response to an error correction value received from the software demodulator 18.

Figure 2:
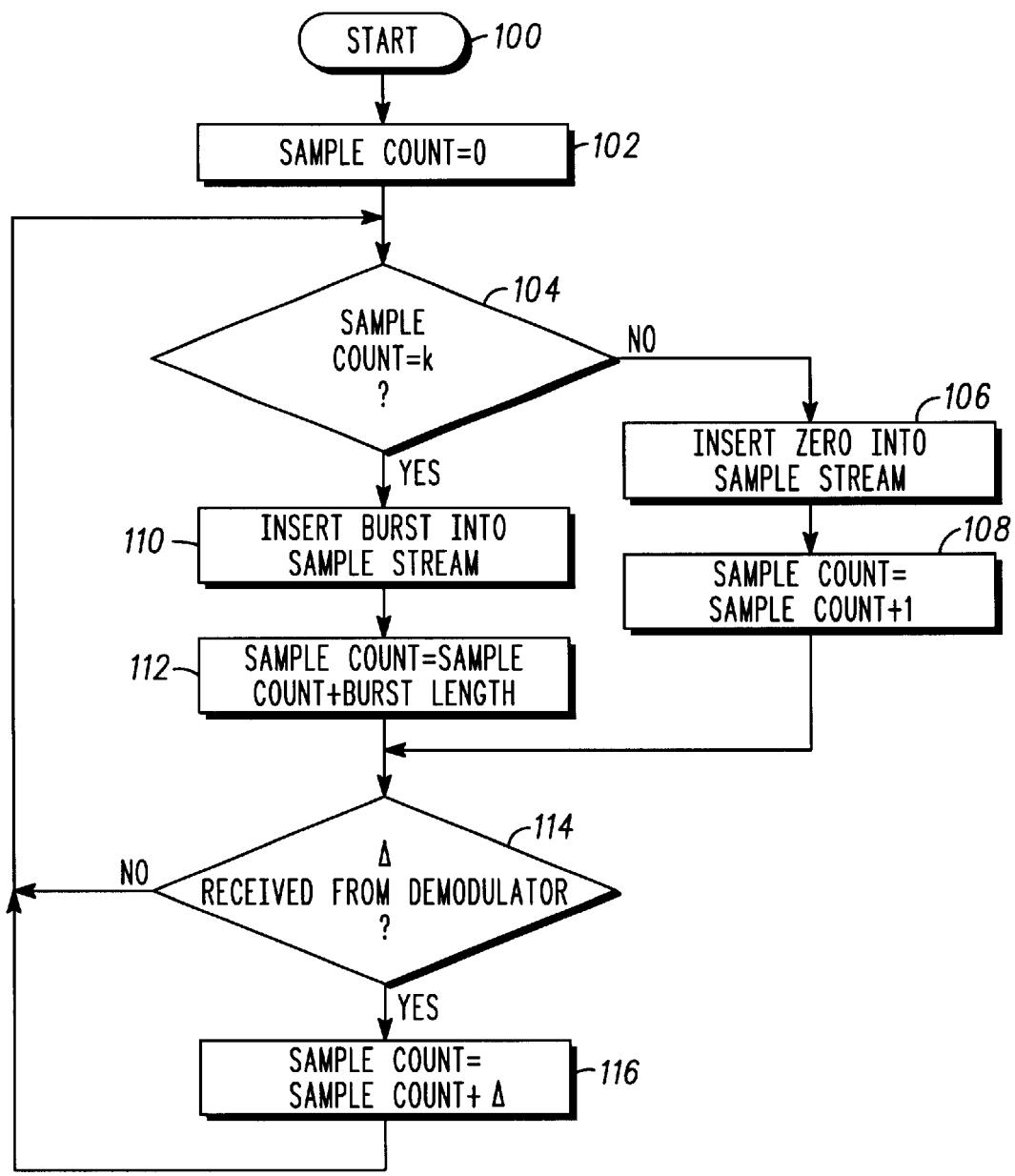
FIG. 2 is a flow diagram of the methodology of the signal calibrator shown in FIG. 1.

Referring now to both FIGS. 1 and 2, the methodology of the signal calibrator 14 of the present invention will now be discussed in more detail. At 100, the waveform application of the radio 10 is started, and therefore the software modulator 16 begins to transmit, and the software demodulator 18 begins to receive, a continuous sample data stream. At 102, the software modulator 16 sets the modulator sample count counter, which is the same as the buffer counter 40, to 0. At 104, the software modulator 16 determines if the modulator sample count counter is equal to k, or, in other words, whether the waveform burst transmission start time within a transmission sample has been reached. If the sample count counter does not equal k, at 106 the software modulator 16 inserts another zero valued data sample or samples into the continuous data stream and at 108 increments the sample count counter.

At 110, if the sample count does equal k, the software modulator 16 inserts the waveform burst into the continuous sample stream and transmits the waveform burst. Subsequently, at 112 the buffer counter 40 of the software modulator 16 increases the sample count by the length of the waveform burst. At 114, the software modulator 16 determines whether the error correction value Δ has been received from the software demodulator 18 via the closed loop feedback path 20. If the error correction value Δ has been received, at 116 the software modulator 16 increases the sample count by the error correction value Δ and then returns to again repeat 104–116 for the next TDMA transmission sample received after the buffer counter 40 rolls over past a predetermined count signaling the end of a current TDMA epoch or frequency hop period (m in the exemplary signal shown in FIG. 1).

In view of the foregoing discussion, it should be appreciated that the signal calibrator of the present invention compensates for delays associated with the underlying software radio system and that may vary in length each time a radio waveform mode is initiated. Therefore, software radio developers can build radios with off the shelf microprocessors of the type that conventionally utilize commercial standardized buses to transfer information and to execute the signal processing software and the A/Ds and D/As. Because off the shelf microprocessors can be used in place of more expensive microprocessors including timers or timing circuits for calibrating the signals, overall system cost reductions and improved accuracy can be achieved.

In addition, because the signal calibrator of the present invention is software-implemented, it obviates the need for special hardware-implemented timing circuits. As a result, the signal calibrator is decoupled from the underlying hardware components and thus may be easily and inexpensively ported to radio systems manufactured by different vendors and having a variety of hardware architectures. The software-implemented signal calibrator 14 of the present invention also enables the RF transmitter and receiver to be physically located in different devices from the modulator and the demodulator. Similarly, the modulator and the demodulator may be located in physically different devices, as long as an information path exists between the two components to enable calibration data to be conveyed between the two components.

The signal calibrator of the present invention is decoupled from a tight association with real time signal processing, as its only provision is that maintains enough data in the modulator and demodulator pipelines 22, 32 so that the pipelines neither overflow or underflow with signal samples. Therefore, because the signal calibrator is close to being an offline processing device, it can be implemented with a general purpose computing machine such as a personal computer connected to the D/A and A/D via an Ethernet, Firewire or Universal Serial Bus connection or the like.

Finally, it should be appreciated that the signal calibrator 14 of the present invention may be implemented in any software-defined communications systems having specific waveform applications that require precise transmission times, such as, for example, TDMA digital cellular systems, GSM cellular systems, military systems utilizing frequency hopping waveforms, and military systems utilizing TDMA signal intelligence waveforms.

While the above description is of the preferred embodiment of the present invention, it should be appreciated that the invention may be modified, altered, or varied without deviating from the scope and fair meaning of the following claims.

What is claimed is:

1. A software-defined communications device comprising:

a modulator for generating a transmission sample including a sample stream and a waveform burst; and a demodulator connected to the modulator and receiving the sample stream via a closed loop feedback path, the demodulator for determining a timing error of the transmission sample and for transmitting a timing error correction value to the modulator via the closed loop feedback path to enable the modulator to adjust a transmission time of a subsequent waveform burst by modifying the content of a subsequent sample stream of a subsequent transmission sample based on the timing error correction value.

2. The software-defined communications device of claim 1, wherein the timing error is a communications device hardware timing error.

3. The software-defined communications device of claim 1, wherein the timing error is an external propagation delay timing error.

4. The software-defined communications device of claim 1, wherein the modulator is for inserting zero valued data samples into the subsequent sample stream of the subsequent transmission sample to temporally retard the subsequent waveform burst corresponding to the subsequent sample stream of the subsequent transmission sample.

5. The software-defined communications device of claim 1, wherein the modulator is for deleting zero valued data samples from the subsequent sample stream of the subsequent transmission sample to temporally advance the subsequent waveform burst corresponding to the subsequent sample stream of the subsequent transmission sample.

6. The software-defined communications device of claim 1, wherein the modulator is for maintaining a count of sequential data samples to be transmitted after being generated by the modulator, and the demodulator is for maintaining a count of sequential data samples received from the modulator, the demodulator further for determining the timing error of the transmission sample by computing timing differences between sequential transmission samples.

7. The software-defined communications device of claim 1, wherein the demodulator is for determining the timing error by monitoring transmitted transmission samples and computing differences between transmission sample arrival times and transmission sample expected arrival times.

8. The software-defined communications device of claim 1, wherein the demodulator is for causing the modulator to adjust the transmission time of the subsequent waveform burst of the subsequent transmission sample by sending a transmission time adjust signal to the modulator via the closed loop feedback path.

9. The software-defined communications device of claim 1, further comprising a modulator interrupt request line for stimulating the modulator to adjust a transmission sample output of the modulator in response to modulator clock period parameters.

10. The software-defined communications device of claim 1, wherein the modulator and the demodulator are software components.

11. The software-defined communications device of claim 10, wherein the modulator and the demodulator are decoupled from underlying system hardware components.

12. The software-defined communications device of claim 10, wherein the demodulator compensates for hardware transport delays.

13. The software-defined communications device of claim 10, wherein the demodulator also compensates for external propagation delays.

14. A method for calibrating a software-defined communications device signal modulator, comprising:

outputting zero valued data samples into a continuous sample stream until a predetermined sample count is reached;

inserting a waveform burst into the continuous sample stream after the predetermined sample count is reached;

receiving an error correction value calculated from a difference between an actual sample stream transmit time and a calculated sample stream transit time;

increasing the zero valued data samples by a predetermined number during a subsequent outputting of zero valued data samples to compensate for the error correction value if the error correction value is greater than zero; and decreasing the zero valued data samples by a predetermined number during a subsequent outputting of zero valued data samples to compensate for the error correction value if the terror correction value is less than zero.

15. The method of claim 14, wherein the outputting of zero valued data samples into a continuous sample stream and the inserting of a waveform burst into the continuous sample stream are performed in an offline manner.

16. The method of claim 14, further comprising polling the modulator to determine when the outputting of zero valued data samples into the continuous sample stream and the inserting of a waveform burst into the continuous sample stream are to be performed.

17. The method of claim 14, further comprising stimulating the modulator to initiate the outputting of zero valued data samples into the continuous sample stream and the inserting of a waveform burst into the continuous sample stream.

18. The method of claim 14, wherein the receiving of an error correction value is performed to compensate for at least one of waveform burst system hardware transport delay and waveform burst external propagation delay.

19. The software-defined communications device of claim 1, further comprising:

a modulator pipeline connected to the modulator for providing an outlet path for the sample stream and the waveform burst;

a transmitter for transmitting the sample stream and the waveform burst, and for receiving the sample stream and the waveform burst from the modulator pipeline;

a receiver for receiving the sample stream transmitted by the transmitter; and a demodulator pipeline for providing a return path for the sample stream received by the receiver.

* * * * *